(12) United States Patent
Yanase et al.

(10) Patent No.: US 7,137,067 B2
(45) Date of Patent: Nov. 14, 2006

(54) DEVICE AND METHOD FOR PRESENTING NEWS INFORMATION

(75) Inventors: Takashi Yanase, Kawasaki (JP); Yoshio Nakao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1124 days.

(21) Appl. No.: 09/748,373

(22) Filed: Dec. 27, 2000

(65) Prior Publication Data

US 2001/0025288 A1 Sep. 27, 2001

(30) Foreign Application Priority Data

Mar. 17, 2000 (JP) .................................. 2000-075836

(51) Int. Cl.
*G06F 17/21* (2006.01)
*G06F 17/30* (2006.01)
G06F 17/24

(52) U.S. Cl. .................. 715/530; 715/511; 715/512; 715/513; 715/517; 715/526; 715/514; 715/515; 715/530; 715/531; 715/539; 707/5; 707/10

(58) Field of Classification Search ......... 715/511–513, 715/517, 526, 514–515, 530–532, 539; 707/10, 707/5

See application file for complete search history.

(56) References Cited

U.S. PATENT DOCUMENTS

| | | | | | |
|---|---|---|---|---|---|
| 5,649,186 | A | * | 7/1997 | Ferguson | 707/10 |
| 5,653,065 | A | * | 8/1997 | McIlwain | 52/65 |
| 5,732,260 | A | * | 3/1998 | Nomiyama | 707/5 |
| 5,907,836 | A | * | 5/1999 | Sumita et al. | 707/2 |
| 5,924,090 | A | * | 7/1999 | Krellenstein | 707/5 |
| 6,205,456 | B1 | | 3/2001 | Nakao | |
| 6,279,013 | B1 | * | 8/2001 | LaMarca et al. | 715/500 |
| 6,301,577 | B1 | * | 10/2001 | Matsumoto et al. | 707/5 |
| 6,460,036 | B1 | * | 10/2002 | Herz | 707/10 |
| 2001/0025288 | A1 | * | 9/2001 | Yanase et al. | 707/530 |

FOREIGN PATENT DOCUMENTS

JP 10-207891 7/1998

* cited by examiner

*Primary Examiner*—Stephen Hong
*Assistant Examiner*—Joshua D. Campbell

(57) ABSTRACT

A user can efficiently obtain useful information by breaking down news information distributed in a form of electronic mail, magazines, etc., in units of articles, selecting from useful information from the broken-down articles, collecting the selected articles, re-editing the articles in a form of news information suited to be presented to a user and outputting the news information.

18 Claims, 27 Drawing Sheets

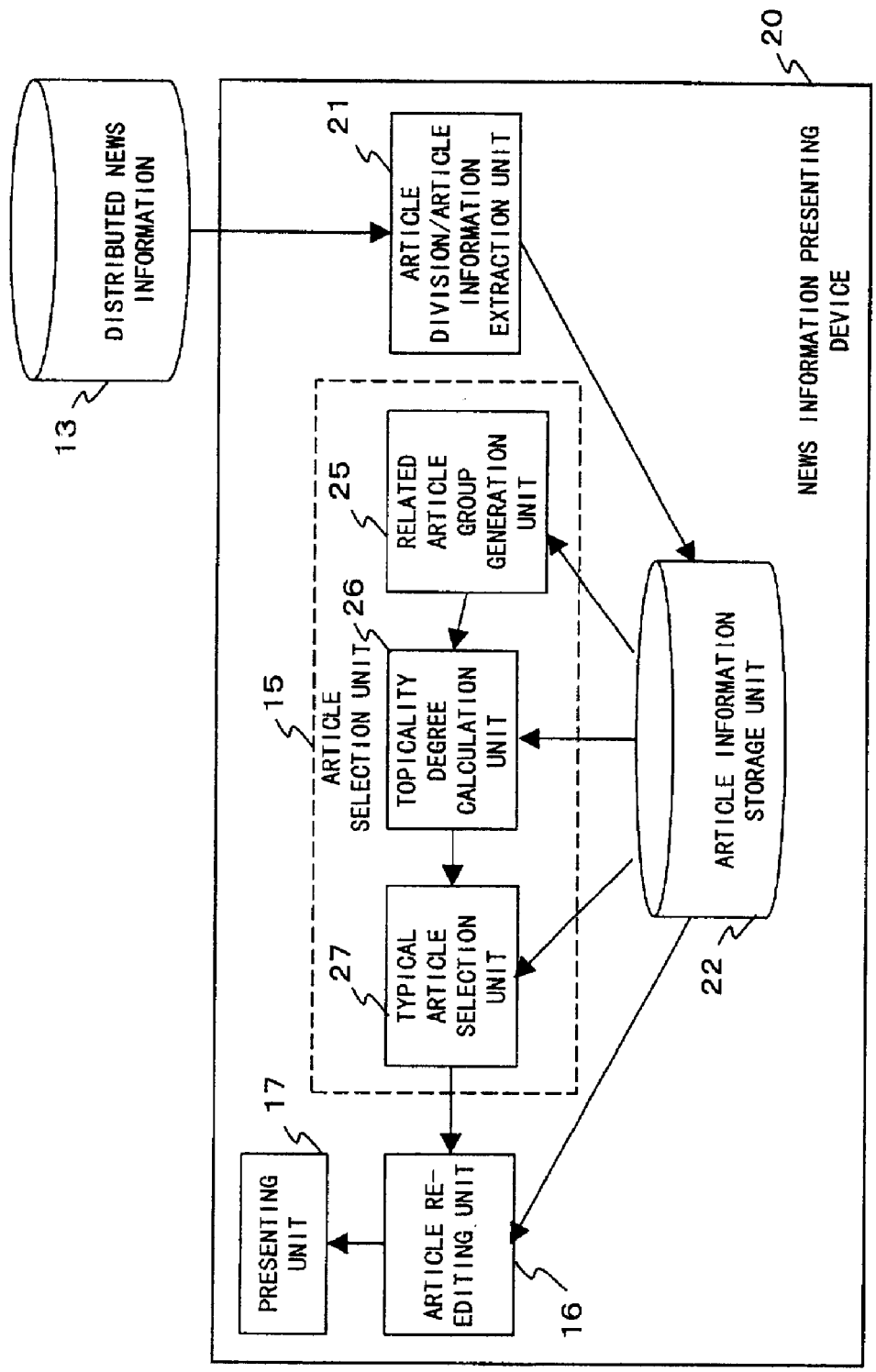
F I G. 3

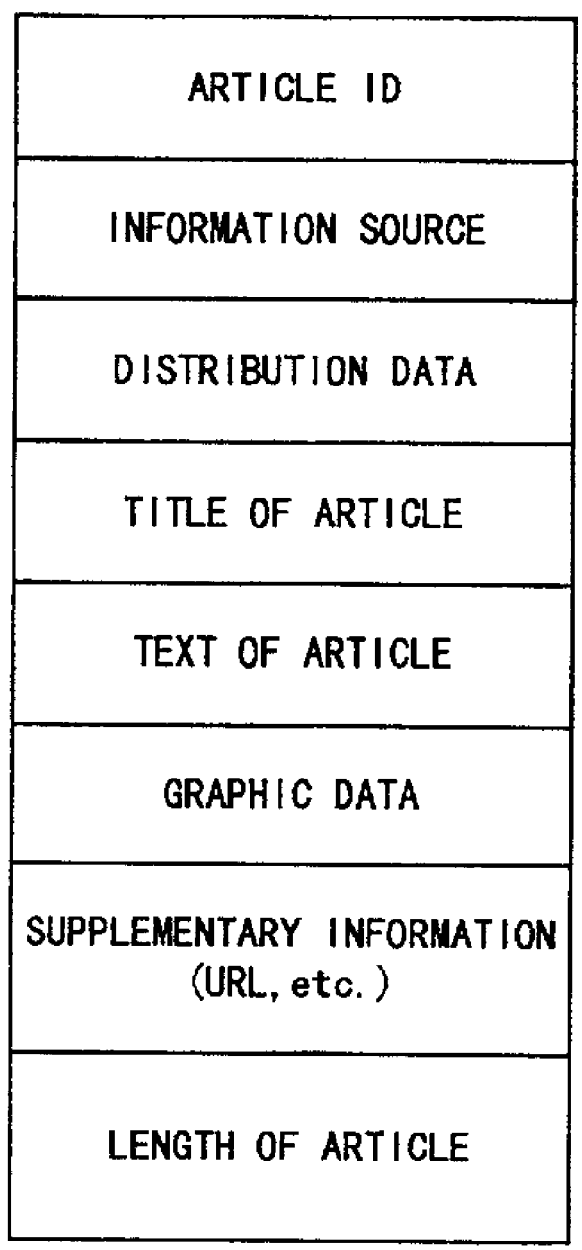
F I G. 6

○○, A SPACE-SAVING DESKTOP COMPUTER WITH 15-INCH MONITOR, WITH A PRICE OF LESS THAN 100,000 YEN.

○○ COMPUTER HAS DISCOUNTED A PART OF SPACE-SAVING DESKTOP COMPUTERS FOR BOTH SOHO/INDIVIDUAL USERS, PCXX SERIES ON 29TH OF THIS MONTH. LESS THAN 100,000 YEN FOR A DESKTOP COMPUTER WITH EQUIPPED WITH 433MHz □□ AND 15-INCH CRT MONITOR.

△△, A 17-INCH SXGA LC DISPLAY

△△ COMPUTER IS SCHEDULED TO SHIP "□□ FLAT PANEL MONITOR" ADOPTING AN 17-INCH FULL COLOR TFT LC PANEL CORRESPONDING TO SXGA (1280x1024) EARLY DECEMBER THIS YEAR.

F I G. 7

05: ○○, A SPACE-SAVING DESKTOP COMPUTER WITH 15-INCH MONITOR, WITH A PRICE OF LESS THAN 100,000 YEN.

http://www.○○.co.jp/
○○ COMPUTER HAS DISCOUNTED A PART OF SPACE-SAVING DESKTOP COMPUTERS FOR BOTH SOHO/INDIVIDUAL USERS, PCXX SERIES ON 29TH OF THIS MONTH, LESS THAN 100,000 YEN FOR A DESKTOP COMPUTER EQUIPPED WITH 433MHz □□ AND 15-INCH CRT MONITOR.

06: △△, A 17-INCH SXGA LC DISPLAY http://www.△△.co.jp/
△△ COMPUTER IS SCHEDULED TO SHIP "□□ FLAT PANEL MONITOR" ADOPTING AN 17-INCH FULL COLOR TFT LC PANEL CORRESPONDING TO SXGA (1280x1024) EARLY DECEMBER THIS YEAR.

| ARTICLE ID | △△△△ |
|---|---|
| INFORMATION SOURCE | ○○○○ |
| DISTRIBUTION DATE | ○○YEAR××MONTH△△DAY |
| TITLE OF ARTICLE | ○○, A SPACE-SAVING DESKTOP COMPUTER WITH 15-INCH MONITOR, WITH A PRICE OF LESS THAN 100,000 YEN |
| TEXT OF ARTICLE | ○○ COMPUTER HAS DISCOUNTED A PART OF SPACE-SAVING DESKTOP COMPUTERS FOR BOTH SOHO/INDIVIDUAL USERS, PCXX SERIES ON 29TH OF THIS MONTH. LESS THAN 100,000 YEN FOR A DESKTOP COMPUTER EQUIPPED WITH 433MHz □□ AND 15-INCH CRT MONITOR. |
| SUPPLEMENTARY INFORMATION | http://www.○○.co.jp/ |
| LENGTH OF ARTICLE | ×××× |

| | |
|---|---|
| ARTICLE ID | △△×× |
| INFORMATION SOURCE | ○○○○ |
| DISTRIBUTION DATE | ○○YEAR××MONTH△△DAY |
| TITLE OF ARTICLE | △△, A 17-INCH SXGA LC DISPLAY |
| TEXT OF ARTICLE | △△ COMPUTER IS SCHEDULED TO SHIP "□□ FLAT PANEL MONITOR" ADOPTING AN 17-INCH FULL COLOR TFT LC PANEL CORRESPONDING TO SXGA (1280×1024) EARLY DECEMBER THIS YEAR. |
| SUPPLEMENTARY INFORMATION | http://www.△△.co.jp/ |
| LENGTH OF ARTICLE | ××△△ |

F I G. 11

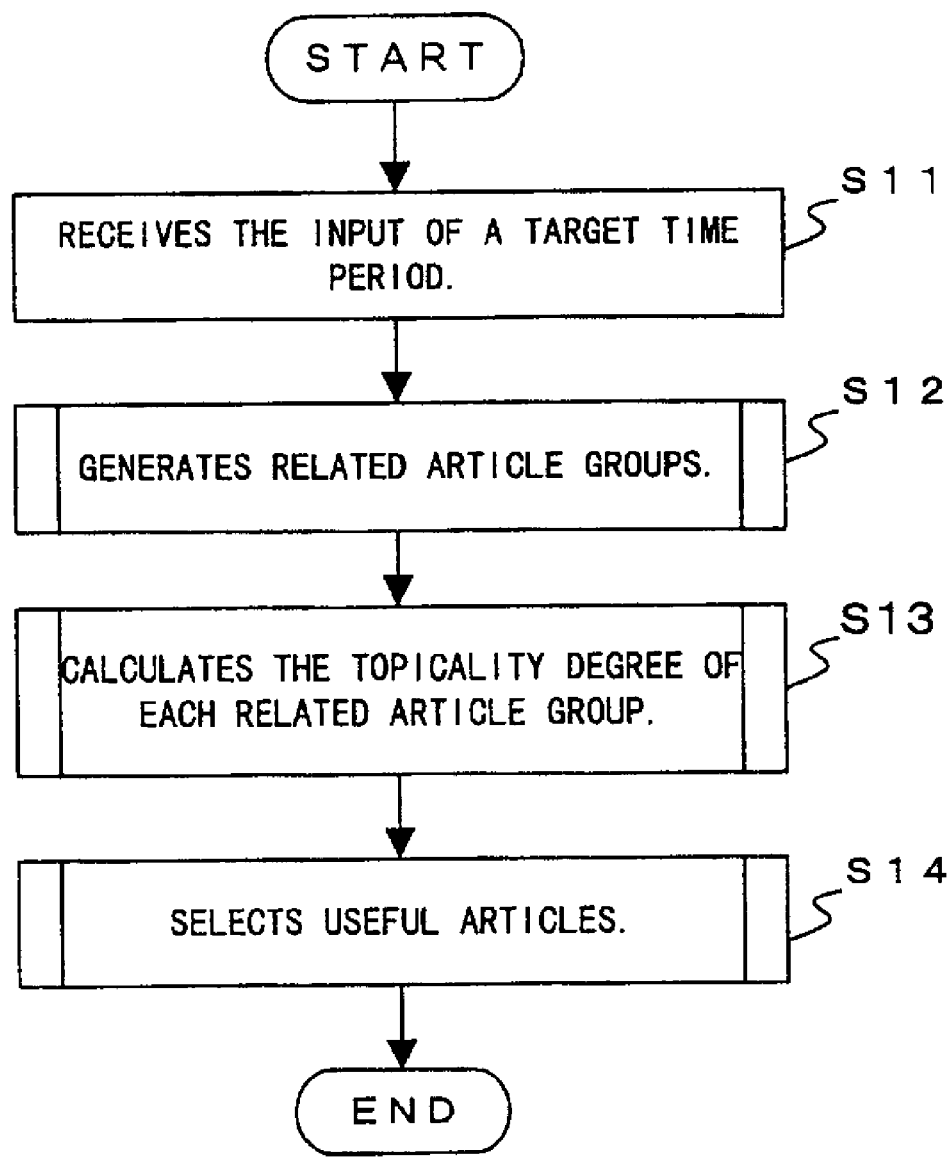
F I G. 1 2

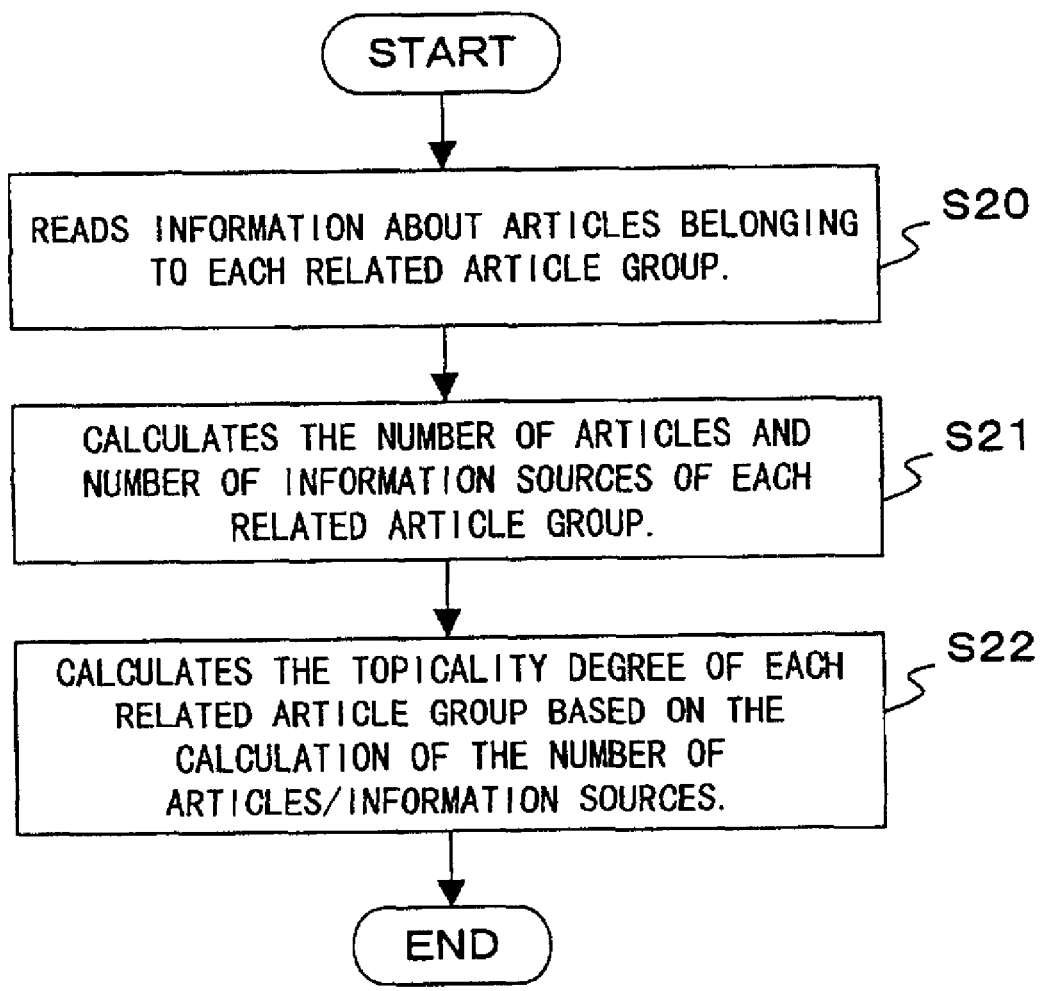
F I G. 1 6

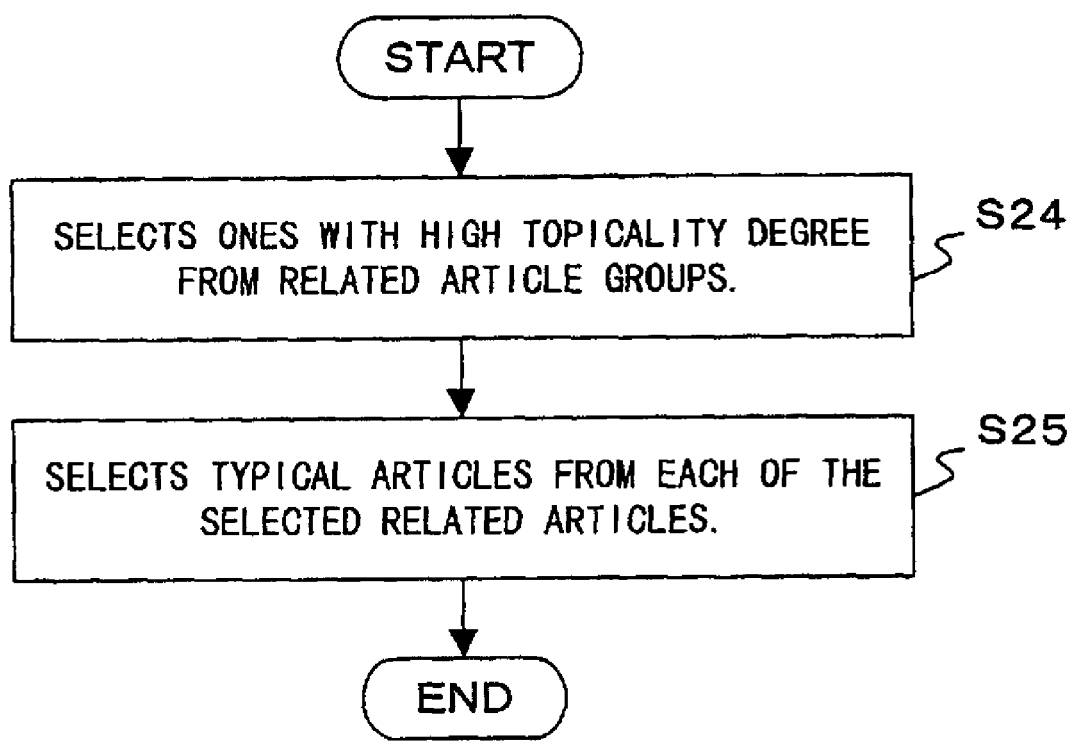
F I G. 1 7

RECOMMENDED TOPIC PRESENTING SETTING

· DISTRIBUTION PERIOD OF TARGET ORIGINAL ARTICLE
  [10] MONTH [1] DAY ~ [10] MONTH [31] DAY

· NUMBER OF DISPLAYED TOPICS
  [3] TOPICS

· SELECTION FROM TYPICAL ARTICLE
  ◉ IN DESCENDING ORDER OF DATE
  ○ IN ASCENDING ORDER OF DATE
  ○ IN DESCENDING ORDER OF LENGTH
  ○ IN ASCENDING ORDER OF LENGTH
  PER "TOPIC" [2] ARTICLES

· DISPLAY METHOD OF ARTICLES
  ☐ ALSO DISPLAYS RELATED ARTICLES
  ☑ DISPLAYS THE TEXT OF ARTICLES
  ○ FULL TEXT
  ○ BEGINNING
  ◉ SUMMARY

FIG. 20

RECOMMENDED LIST OF ARTICLES

• COM JAPAN 1999 HAS BEEN OPENED AT TOKYO BIG SITE(○○ NEWSPAPER, 02/11/1999).
AN EXHIBITION ON INFORMATION/TELECOMMUNICATIONS EQUIPMENT AND SERVICES "COM JAPAN 1999"
HAS BEEN OPENED AT "TOKYO BIG SITE" IN ARIAKE, TOKYO ON 2ND OF THIS MONTH FOR THE NEXT
FOUR DAYS, THAT IS, UNTIL 5TH OF THIS MONTH. 301 ENTERPRISES/ASSOCIATIONS, INCLUDING 9
FOREIGN COUNTRIES HAVE PARTICIPATED IN THE EXHIBITION, WHICH IT IS ALREADY DECIDED THAT
IS UNITED WITH AN EXHIBITION ON ELECTRONIC EQUIPMENT "ELECTRONICS SHOW" NEXT YEAR AND
AFTER. APPROXIMATELY 180,000 VIEWERS ARE ANTICIPATED.

• △△MANAGING DIRECTOR HAS BEEN PROMOTED TO NEW ○○ PRESIDENT, AND MR. XX HAS BEEN
TRANSFERRED TO AP PRESIDENT (○○ NEWSPAPER, 02/11/1999)

• ○○ HAS ANNOUNCED ON 2ND OF THIS MONTH THAT □□ PRESIDENT HAS BEEN TRANSFERRED TO
REPRESENTATIVE CHAIRMAN UNDER DATE OF DECEMBER 1ST AND △△MANAGING DIRECTOR HAS BEEN
PROMOTED TO PRESIDENT.

• □□ PUT ON SALE A PC INTEGRATED WITH A MONITOR, WITH A PRICE OF LESS THAN 90,000YEN
(○○ NEWSPAPER, 02/11/1999)
□□ HAS PUT ON SALE A DESKTOP PERSONAL COMPUTER FOR PRIVATE USE, INCORPORATED WITH A
15-INCH CRT "XXXX" ON ITS WEBSITE.

F I G. 21

- COM JAPAN 1999 HAS BEEN OPENED AT TOKYO BIG SITE (○○ NEWSPAPER, 02/11/1999)

AN EXHIBITION ON INFORMATION/TELECOMMUNICATIONS EQUIPMENT AND SERVICES "COM JAPAN 1999" HAS BEEN OPENED AT "TOKYO BIG SITE" IN ARIAKE, TOKYO ON 2ND OF THIS MONTH FOR THE NEXT FOUR DAYS, I.E., UNTIL 5TH OF THIS MONTH. 301 ENTERPRISES/ASSOCIATIONS, INCLUDING 9 FOREIGN COUNTRIES HAVE PARTICIPATED IN THE EXHIBITION, WHICH IT IS ALREADY DECIDED THAT IS UNITED WITH AN EXHIBITION ON ELECTRONIC EQUIPMENT "ELECTRONICS SHOW" NEXT YEAR AND AFTER. APPROXIMATELY 180,000 VIEWERS ARE ANTICIPATED.

RELATED ARTICLES

- A COMPREHENSIVE INFORMATION/TELECOMMUNICATIONS EXHIBITION "COM JAPAN 1999" OPENED (×× NEWSPAPER, 03/11/1999)

A COMPREHENSIVE INFORMATION/TELECOMMUNICATIONS EXHIVITION "COM JAPAN 1999" HAS BEEN OPENED AT TOKYO BIG SITE.
THE SPONSORS ARE THREE ASSOCIATIONS:INSTITUTE OF TELECOMMUNICATIONS MACHINERY INDUSTRY, PROMOTION ASSOCIATION FOR JAPAN ELECTRONICS INDUSTRY AND JAPAN PERSONAL COMPUTER SOFTWARE ASSOCIATION.

- COM JAPAN 1999 OPENED (△△ NEWSPAPER, 03/11/1999)

A COMPREHENSIVE INFORMATION/TELECOMMUNICATIONS-RELATED EVENT "COM JAPAN 1999" HAS BEEN OPENED AT ARIAKE TOKYO INTERNATIONAL EXHIBITION HALL (TOKYO BIG SITE) ON 2ND OF THIS MONTH UNDER THE SLOGAN "BUSINESS AND LIFE IN THE 21ST CENTURY CREATED BY INFORMATION/TELECOMMUNICATIONS".

F I G. 22

- COM JAPAN 1999 OPENED AT TOKYO BIG SITE (○○NEWSPAPER, 02/11/1999)

AN EXHIBITION FOR INFORMATION/TELECOMMUNICATIONS EQUIPMENT AND SREVISES "COM JAPAN 1999" HAS BEEN OPENED AT "TOKYO BIG SITE" IN ARIAKE, TOKYO ON 2ND OF THIS MONTH FOR THE NEXT FOUR DAYS, i.e., UNTIL 5TH.

RELATED ARTICLES

- A COMPREHENSIVE INFORMATION/TELECOMMUNICATIONS EXHIBITION "COM JAPAN 1999" OPENED (××NEWSPAPER, 03/11/1999)
  (△△NEWSPAPER, 03/11/1999)

- COM JAPAN 1999 OPENED (△△NEWSPAPER, 03/11/1999)

F I G. 2 3

RECOMMENDED LIST OF ARTICLES

- COM JAPAN 1999 OPENED AT TOKYO BIG SITE
  (○○NEWSPAPER, 02/11/1999)

AN EXHIBITION FOR INFORMATION/TELECOMMUNICATIONS EQUIPMENT AND SERVICES "COM JAPAN 1999" HAS BEEN OPENED AT "TOKYO BIG SITE" IN ARIAKE, TOKYO ON 2ND OF THIS MONTH FOR THE NEXT FOUR DAYS, I.E., UNTIL 5TH.

- △△ MANAGING DIRECTOR HAS BEEN PROMOTED TO NEW ○○ PRESIDENT, AND MR. ×× HAS BEEN TRANSFERRED TO AP PRESIDENT (○○ NEWSPAPER, 02/11/1999)

○○ HAS ANNOUNCED ON 2ND OF THIS MONTH THAT □□ PRESIDENT HAS BEEN TRANSFERRED TO REPRESENTATIVE CHAIRMAN UNDER DATE OF DECEMBER 1 AND △△ MANAGING DIRECTOR HAS BEEN PROMOTED TO PRESIDENT.

RELATED ARTICLES

- A COMPREHENSIVE INFORMATION/TELECOMMUNICATIONS EXHIBITION "COM JAPAN 1999" OPENED
  (××NEWSPAPER, 03/11/1999)
- COM JAPAN 1999 OPENED (△△NEWSPAPER, 03/11/1999)

- ○○ TRANSFERRED MR. ×× OF ○○ JAPAN TO THE AREA MANAGER OF ASIA/PACIFIC AREAS (××NEWSPAPER, 04/11/1999)

- □□ CHAIRMAN PROMOTED MR. ×× TO THE AP PRESIDENT OF ○○—THE FIRST ASIAN (□□NEWSPAPER, 03/11/1999)

FIG. 24

ARTICLE TO BE NOTED FOR (NOVEMBER 2)

- COM JAPAN 1999 OPENED AT TOKYO BIG SITE

- OTOSHI MANAGING DIRECTOR HAS BEEN PROMOTED TO THE NEW PRESIDENT OF IBM JAPAN AND MR. HOJO PROMOTED TO AP PRESIDENT

- GATEWAY JAPAN PUT ON SALE A PC INTEGRATED WITH A MONITOR, WITH A PRICE OF LESS THAN 90,000 YEN

- LASER FIVE REINFORCED LINUX CLUSTER BUSINESS

- FUJITSU PUT ON SALE A PEN-INPUT PC FOR BUSINESS USE, WITH WINDOWS CE INSTALLED

FIG. 25

DEVICE AND METHOD FOR PRESENTING NEWS INFORMATION

BACKGROUND OF THE INVENTION

1. Field of the Invention

The present invention relates to the presenting method of news information, and specifically, it relates to a news information presenting device and method for selecting generally topical and useful information from a great amount of news information distributed by electronic mail, etc., re-editing the information in an appropriate form according to the purpose of a user and presenting the re-edited information.

2. Description of the Related Art

With the recent spread of personal computers and the Internet, even individuals can easily obtain a great amount of information. One method for collecting information using the Internet is an information distribution service using electronic mail. In this service, if a mail address is registered in advance in a distribution source, news and a variety of information are automatically distributed by electronic mail. Therefore, we can stay home and obtain the latest information. Using this information service we can easily obtain high-quality information without accessing a specific site each time unlike WWW (World Wide Web).

However, if we receive information by such a service, the amount of information is too large for us to go through all pieces of information, which is a problem. In other words, it is difficult for a user to find out useful information for him/her from distributed information.

In such a case, as a typical technology for extracting articles interesting for a user, there is a technology for searching for and presenting information meeting search requirements by inputting the search requirements using a keyword, etc., corresponding to information that a user wants to extract.

As another technology, there is also a content filtering. In the content filtering, if a user registers search requirements in advance in a form of a user profile, only information meeting these search requirements are selected and presented to the user.

If in this way, we receive news by electronic mail, a plurality of articles, including a plurality of topics are often distributed at one time. Such mail sometimes also includes information other than news, such as advertisement, etc. Therefore, if the user simply keeps the mail, efficient information acquisition, such as the acquisition of only articles, including a specific topic is difficult, which is another problem.

Next, when searching for articles, a user must input search requirements to the system, and the user must have a clear intention to search for. In the case of the content filtering, it is necessary for a user to input his/her interesting topics to the system in a form of a keyword, etc., prior to the distribution of articles. Therefore, if a user does not have a clear intention to search for or if a user wants to obtain generally topical articles across a variety of fields, such information cannot be appropriately extracted, which is another problem.

SUMMARY OF THE INVENTION

It is one object of the present invention is to provide news information presenting device and method for extracting useful information from news information distributed within a time period specified by a user and presenting the extracted useful information to the user in order to solve the problems described above. It is another object of the present invention is to provide news information presenting device and method for presenting useful information based on a user's requirements, the restrictions of a display screen, etc.

The news information presenting device, which is one aspect of the present invention, comprises a news information division unit breaking down news information in units of articles when extracting useful information from the news information and presenting the extracted information to a user, a useful article selection unit selecting useful articles, such as highly topical articles, etc., from the broken-down articles and a news information re-editing unit collecting the selected articles, re-editing the collected articles in a form suited to be presented to a user and outputting the re-edited information.

According to the configuration described above, since a useful article that is selected from news information distributed, for example, in a form of electronic mail is re-edited in a form of news information and is presented to a user, the user can efficiently obtain useful information.

In the above aspect of the present invention, the news information division unit can also be designed to detect the article portions of the news information by the document format analysis of news information and to break down the news information in units of articles.

In the above aspect of the present invention, the useful article selection unit can include an article grouping unit, an article group selection unit and a typical article selection unit.

The article grouping unit classifies articles broken down by the news information division unit into a plurality of groups, based on the similarity degree among the broken-down articles.

The article group selection unit selects one or more groups from the plurality of groups classified by the article grouping unit, based on topicality degree for indicating the topicality of each group.

The typical article selection unit selects one or more typical articles from each of the one or more groups selected by the article group selection unit.

In this case, the article group selection unit can also calculate the topicality based on both the total number of articles belonging to a group and the number of the information sources of articles belonging to the group.

In the above aspect of the present invention, the news information presenting device can also further comprise a user instruction input unit for receiving user's instructions on news information presenting. Alternatively, the typical article selection unit can select one or more typical articles according to the user's instructions.

In this case, the typical article selection unit can also select typical articles according to a user's instruction on the distribution date of news information.

In the above aspect of the present invention, the news information re-editing unit can also output one or more typical articles of each of the one or more groups in order based on the topicality and/or distribution date of the typical articles of the one or more selected groups described above.

In this case, the news information re-editing unit can also further output one or more typical articles of each of the one or more groups as related articles in addition to the one or more typical articles of the one or more groups, can also output a simplified typical article obtained by omitting a part of the content of a typical article and can set up a hyper-link to the original typical article in the simplified typical article or can also output graphics included the article of a group belonging to the typical article or simplified typical article together with the article.

In the above aspect of the present invention, the news information re-editing unit can also convert the contents of one or more typical articles of each of the one or more groups into a form suited to be loudly read and output the converted contents in order based on the topicality and/or distribution date of the typical articles of the one or more groups selected by the article group selection unit.

In the news information presenting method, which is one aspect of the present invention, news information is broken down in units of articles, useful articles are selected from the broken-down articles, the selected articles are collected, the articles are re-edited in a form of news information suited to be presented to a user and the re-edited articles are outputted.

In the above aspect of the present invention, useful articles can also be selected by classifying broken-down articles based on the similarity degree among the articles into a plurality of groups, selecting one or more groups from the plurality of groups based on the topicality degree for indicating the topicality of each group and selecting one or more typical articles from each of the selected one or more groups.

The computer-readable portable storage medium, which is one aspect of the present invention, stores a program for enabling a computer to execute the steps of breaking down news information in units of articles, of selecting useful articles from the broken-down articles and of collecting the selected articles, re-editing the collected articles in a form of news information suited to be presented to a user and outputting the re-edited article.

In the above aspect of the present invention, the step of selecting useful articles out of the steps stored in this portable storage medium can also further comprise the steps of classifying broken-down articles into a plurality of groups based on the similarity degree among the broken-down articles, of selecting one or more groups from the plurality of groups based on the topicality degree for indicating the topicality of each group and of selecting one or more typical articles from each of the one or more groups.

In this way, according to the present invention, for example, news information distributed in a form of electronic mail is broken down into individual articles, articles with related contents are grouped and typical articles in the group are re-edited in a form of news information and outputted.

BRIEF DESCRIPTION OF THE DRAWINGS

The present invention will be more apparent from the following detailed description when the accompanying drawings are referenced.

FIG. 3 shows the configuration of the news information presenting device.

FIG. 6 shows an example of the data structure of article information stored in an article information storage unit.

FIG. 7 shows a first example of news information distributed by electronic mail.

FIG. 9 shows a second example of news information distributed by electronic mail.

FIG. 10 shows an example of data stored in the article information storage unit for the news information shown in FIGS. 7 and 9 (No. 1).

FIG. 11 shows an example of data stored in the article information storage unit for the news information shown in FIGS. 7 and 9 (No. 2).

FIG. 12 is a flowchart showing the entire process of an article selection unit.

FIG. 16 is a flowchart showing the process of a topicality degree calculation unit.

FIG. 17 is a flowchart showing the process of a typical article selection unit.

FIG. 20 shows an example of the screen where user's requirements are inputted.

FIG. 21 shows a first example of article re-editing.

FIG. 22 shows a second example of article re-editing.

FIG. 23 shows a third example of article re-editing.

FIG. 24 shows a fourth example of article re-editing.

FIG. 25 shows an example of news information to be loudly read.

DESCRIPTION OF THE PREFERRED EMBODIMENTS

Figure 1:
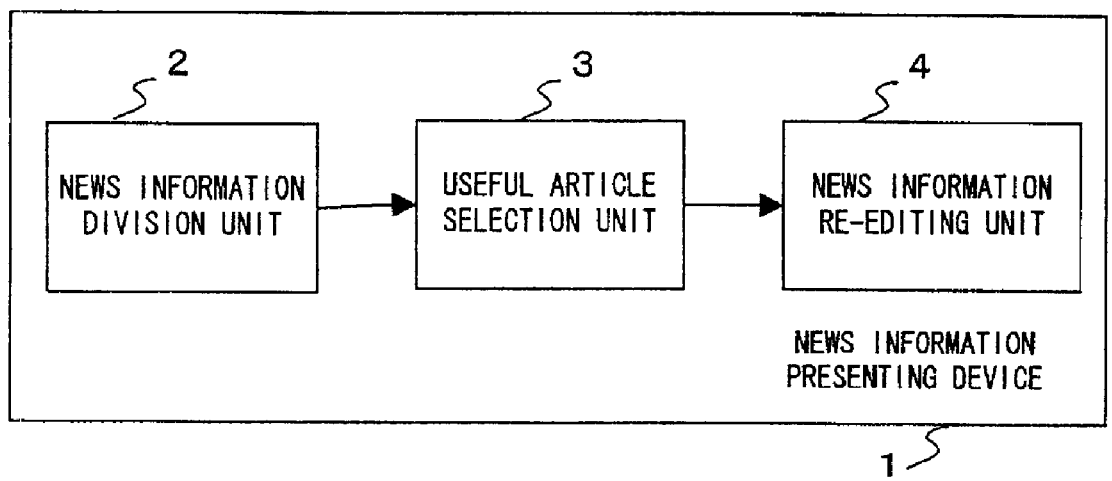
FIG. 1 shows the basic configuration of the news information presenting device of the present invention.

FIG. 1 shows the basic configuration of the news information presenting device of the present invention. The news information presenting device shown in FIG. 1, extracts, for example, generally topical information from a great amount of news information distributed, for example, by electronic mail as useful information and presents the extracted information to a user.

The news information presenting device 1 of the present invention shown in FIG. 1 comprises a news information division unit 2, a useful article selection unit 3 and a news information re-editing unit 4.

The news information division unit 2 breaks down news information distributed, for example, by electronic mail in units of articles.

The useful article selection unit 3 selects articles useful for a user, such as highly topical articles, etc., from the articles broken down by the news information division unit 2.

The news information re-editing unit 4 collects the articles selected by the useful article selection unit 3, re-edits the collected articles in a form suited to be presented to a user and outputs the re-edited articles.

According to the configuration described above, since useful articles that are selected from news information distributed, for example, in a form of electronic mail are re-edited in a form of news information and are presented to a user, the user can efficiently obtain useful information.

Figure 2:
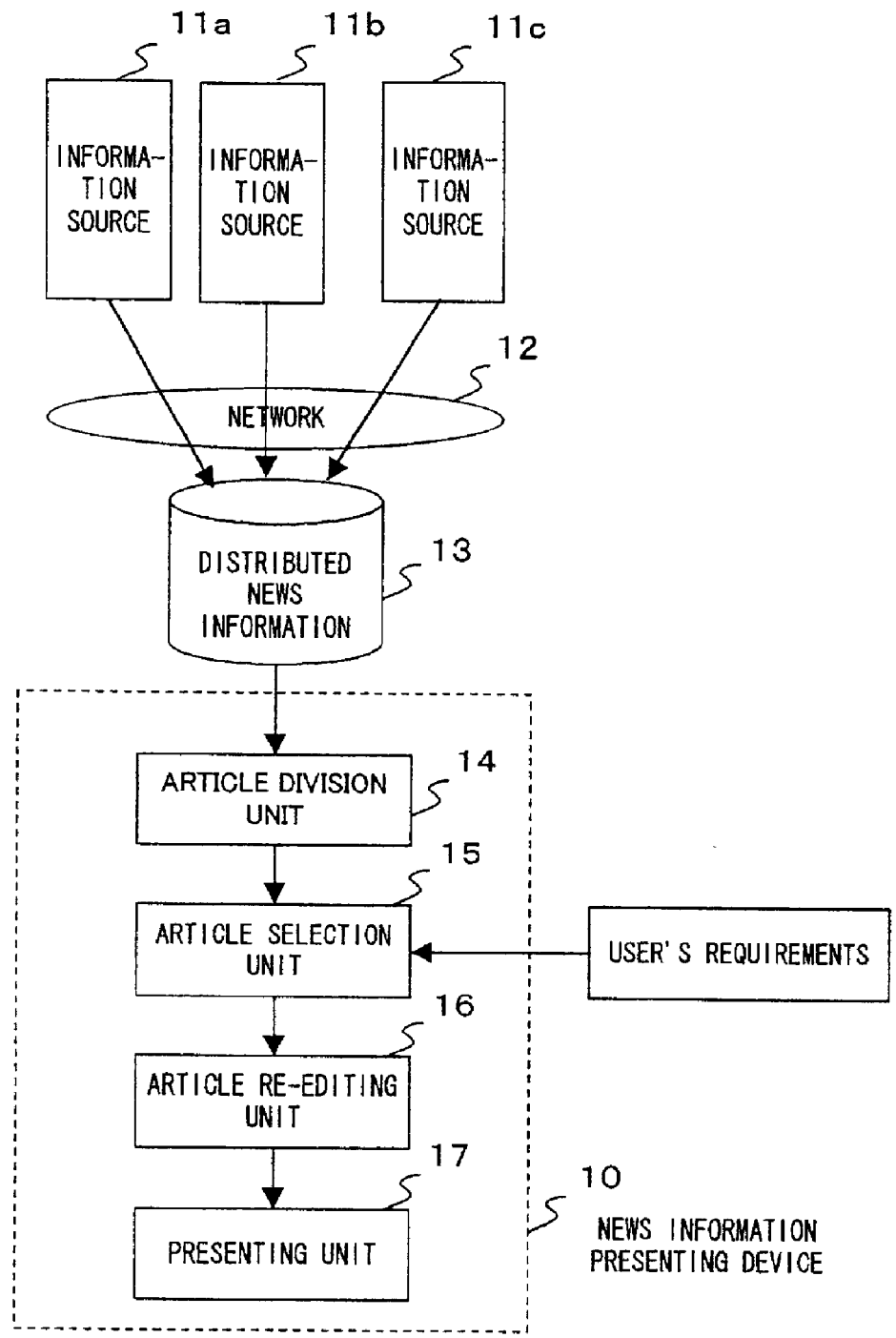
FIG. 2 shows the system configuration of the news information presenting device of the present invention.

FIG. 2 shows the system configuration of the news information presenting device of the present invention. Generally, news information is distributed to the news information presenting device 10 shown in FIG. 2 from a plurality of information sources 11a to 11c via a network 12. The distributed news information 13 is provided to the news information presenting device 10. In this case, not only news information distributed via a network 12, for example, like electronic mail, but news information obtained, for example, from a magazine, etc., can also be provided to the news information presenting device 10.

The news information presenting device 10 comprises an article division unit 14 for breaking down news information into individual articles, an article selection unit 15 for selecting the broken-down articles based on user's requirements, etc., an article re-editing unit 16 for re-editing the selected articles in a form of news information, for example, based on user's requirements and a presenting unit 17 for presenting the re-edited news information to the user.

FIG. 3 shows the configuration of the news information presenting device. The news information presenting device 20 shown in FIG. 3 comprises an article division/article information extraction unit 21 corresponding to the article division unit 14 shown in FIG. 2, an article selection unit 15, an article re-editing unit 16, a presenting unit 17 and an article information storage unit 22 for storing the broken-down article information.

The article division/article information extraction unit 21 reads distributed news information 13, extracts the article portions, breaks down the article portions into individual articles, extracts information required to calculate the similarity degree among a plurality of pieces of information/articles, such as the information source, distribution date of each article, etc., and outputs the result to the article information storage unit 22.

The article selection unit 15 includes a related article group generation unit 25, a topicality degree calculation unit 26 and a typical article selection unit 27. The article selection unit 15 reads article information stored in the article information storage unit 22, selects information useful for a user and outputs the result to the article re-editing unit 16.

The related article group generation unit 25 extracts articles distributed, for example, within a time period specified by a user from the article information storage unit 22, calculates the similarity degree among the distributed articles, groups articles with related contents and generates a related article group.

The topicality degree calculation unit 26 calculates the topicality degree for indicating the topicality degree of each of the related article groups generated by the related article generation unit 25. This calculation is described later.

The typical article selection unit 27 selects highly topical related article groups based on the topicality degree of each group calculated by the topicality degree calculation unit 26 and further selects typical articles and also related articles, if required, from the selected related article groups. This selections of both typical articles and related articles are described later.

The article re-editing unit 16 collects both the typical and related articles selected by the typical article selection unit 27 of the article selection unit 15, determines the output order of the articles, arranges the articles, for example, based on the appropriate form or layout suited for a user's usage and generates news information suited to be presented to the user.

The presenting unit 17 presents the news information generated by the article re-editing unit 16 to the user.

Figure 4:
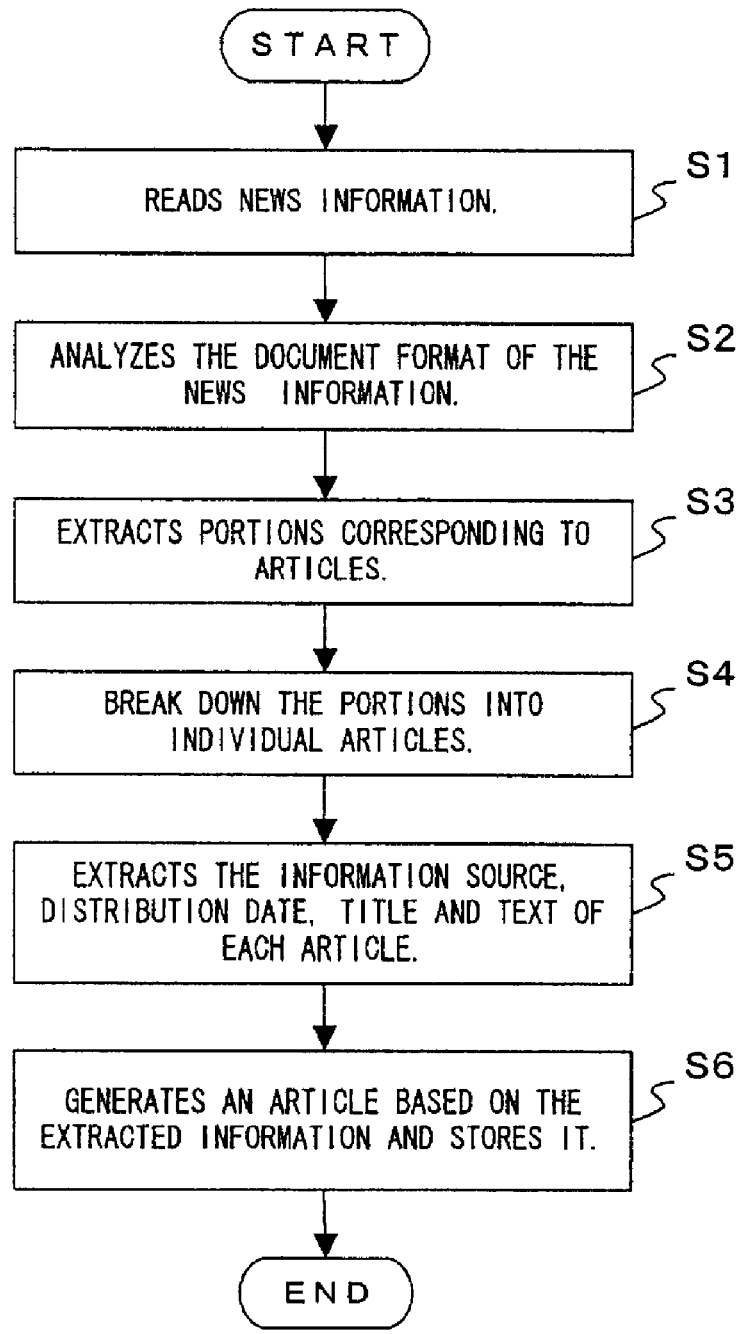
FIG. 4 is a flowchart showing the process of an article division/article information extraction unit (No. 1).

FIG. 4 is a flowchart showing the process of an article division/article information extraction unit. When in FIG. 4 the process is started, first, in step S1 news information is read, and in step S2 the document format of the news information is analyzed. In this description it is assumed that the document format of news information is already determined, and the document format analysis method is described later.

In step S3, article portions are extracted as an analysis result of the document format, and in step S4, each of the article portions are broken down into individual articles. Then, in step S5, as to each article, the distribution source (information source), distribution date, title, text, etc., are extracted, an article is generated with the information extracted in step S6, the result is stored in the article information storage unit 22 shown in FIG. 3 and the process is terminated.

Figure 5:
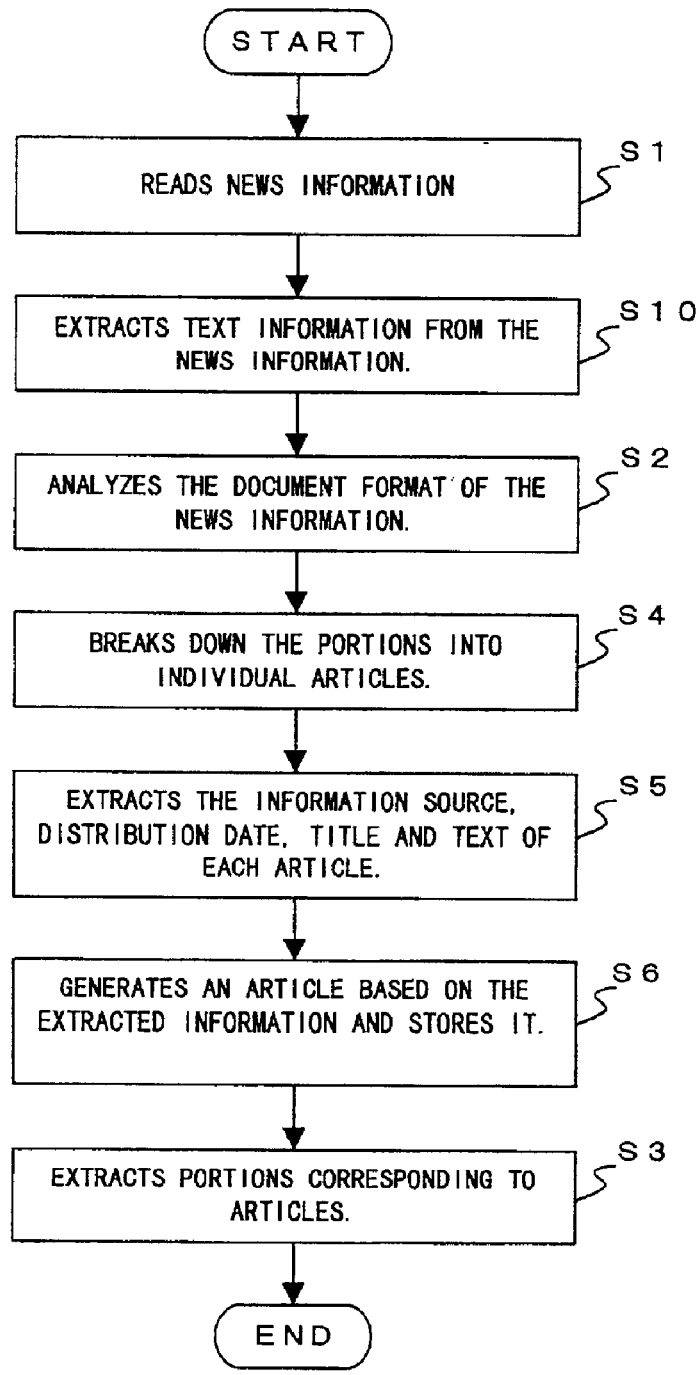
FIG. 5 is a flowchart showing the process of an article division/article information extraction unit (No. 2).

FIG. 5 is a flowchart showing the process of the article division/article information extraction unit in the case where articles are extracted, for example, from information in a magazine, etc. When FIG. 5 is compared with FIG. 4, only the difference between them is that in FIG. 5, after in step S1 news information is read, in step S10 text information is extracted and in step S2 the document format of news information is analyzed.

When extracting article information from a printed matter, only text information must be extracted from the printed matter by removing information about photographs, drawings, etc. A variety of technologies can be used for this process. For example, information provided in a form of image data can be handled by a character recognition technology using an OCR (Optical Character Reader). Although as described earlier, a document format is assumed to be determined in document format analysis, format conversion to the specific document format, etc., can be included and executed in the extraction process of this text information.

FIG. 6 shows an example of the data structure of article information stored in the article information storage unit 22. Article information about one article is composed of an article identifier (ID), an information source, a distribution date, the title of an article, the text of an article, graphic data, supplementary information and the length of an article.

The article ID is a value peculiar to an article, and it is used to identify each article and to relate the article to the original article. The information source is the name of an information source distributing the article, such as the name of newspaper, etc. The graphic data store data on drawings and charts, if required, when they are included in an article. The supplementary information is data that are not directly related to the text of an article, but that play a supplementary role, such as link information to a related article, for example a URL (Uniform Resource Locator) address, etc.

It is assumed that the document format analysis in step S2 shown in FIGS. 4 and 5 is made according to predetermined rules. Examples of the rules are as follows:

(1) A line where a specific character, such as "....", "＿＿", etc., consecutively appears shall be regarded as a separator for separating articles from each other or separating the title of an article from the text of an article.

(2) A section separated from a subsequent section with only one-spaced line shall be regarded as the title of an article.

(3) A section separated from a subsequent section shall be regarded as the text of an article.

(4) A section beginning with "http://" shall be regarded as link information for accessing related information.

Figure 8:
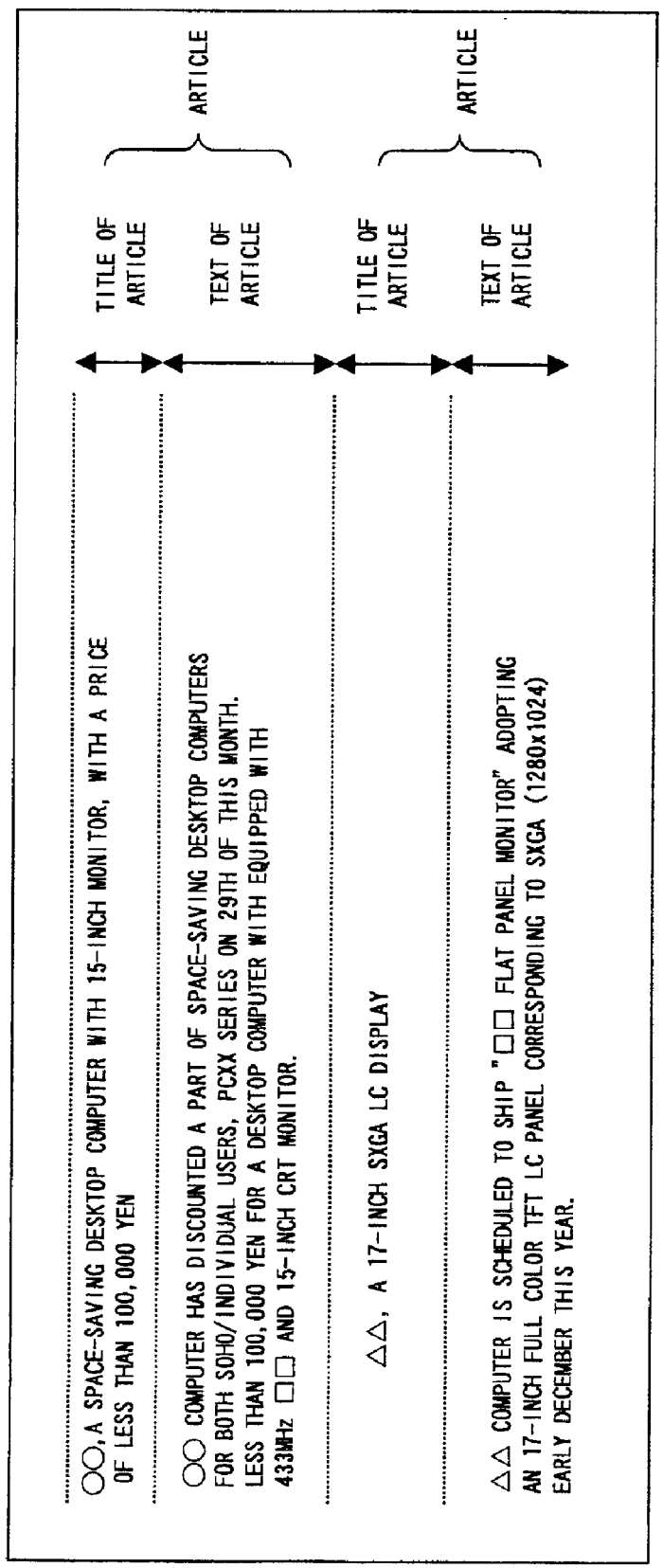
FIG. 8 shows the result of the document format analysis of the news information shown in FIG. 7.

FIG. 7 shows an example of news information distributed by electronic mail. FIG. 8 shows a result obtained by making the document format analysis of this example according to the rules described above. In FIG. 7 there are lines where the same code continues like "....". First, these lines are regarded as separators, the text is broken down. Then, the number of space lines of each section between two consecutive broken-down sections is checked. A section separated from a subsequent section with only one line is regarded as the title of an article, and a section separated from a subsequent section with a plurality of lines is regarded as the text of an article. Then, the title and text are paired as one block and the pair is extracted as one article. In this way, the text shown in FIG. 7 is broken down into two articles.

FIG. 9 shows another example of news information distributed by electronic mail. In the text shown in FIG. 9 there are lines where the same code continues like "". First, these lines are regarded as separators and the text is broken down. The judgments on both the title and the text of an article are the same as those described with reference to FIG. 7.

A section beginning with "http://" is regarded as link information, is separated from the text of an article and is stored as supplementary information shown in FIG. 6.

FIGS. 10 and 11 show results obtained by extracting the titles and text of articles from the two pieces of text shown in FIGS. 7 and 9, respectively, and storing the data in the article information storage unit 22. Since, for example, in the case of electronic mail, both a distribution date and information source are described in a header section, they can be easily extracted. Article numbers 05 and 06 attached to two pieces of mail shown in FIG. 9 are unnecessary information and are not stored in the article information storage unit 22.

FIG. 12 is a flowchart showing the entire process of the article selection unit 15 shown in FIG. 3. If in FIG. 12 the process is started, first in step S1, for example, a target time period is inputted by a user. The user desires that highly topical articles are presented as useful articles within this target time period.

Then, in step S12, related article groups are generated by the related article group generation unit 25 shown in FIG. 3. In this generation process of related articles, as described later, generally the similarity degree among all combinations of two articles are calculated for all articles within the target time period designated by a user, and articles with high similarity degree are formed into one related article group.

Then, in step S13, the topicality degree of each related article group is calculated by the topicality degree calculation unit 26 shown in FIG. 3. This calculation of topicality degree is described later.

Lastly, in step S14, useful articles, such as typical articles described later are selected, for example, from ones with high topicality degree out of related article groups by the typical article selection unit 27 and the process is terminated.

Figure 13:
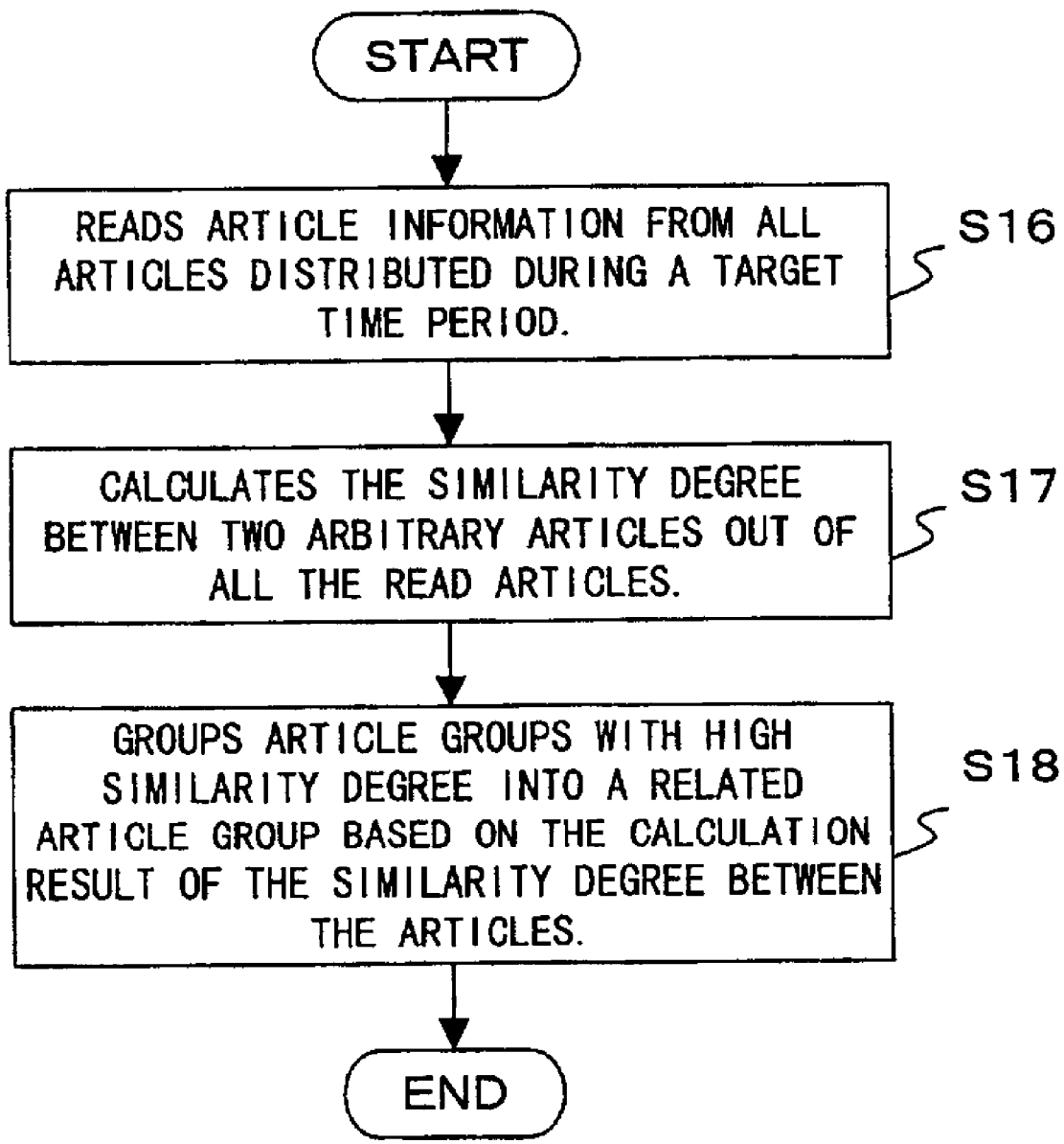
FIG. 13 is a flowchart showing the process of a related article group generation unit.

FIG. 13 is a flowchart showing the process of the related article group generation unit 25. If in FIG. 13 the process is started, first, in step S16, article information about all articles distributed within a target time period specified by a user are read from the article information storage unit 22, and in step S17, the similarity degree between arbitrary two articles is calculated for all the articles.

The similarity degree S between two articles $A_1$ and $A_2$ is calculated according to the following equation.

$$S = \frac{\sum_{i,j} S_{ij}}{\min\{n(A_1), n(A_2)\}} \quad (1)$$

In the above equation, $$S_{ij} = \frac{|W_{ij}|}{\min(|W_i|, |W_j|)} \quad (2)$$

However, in the above equations, $w_i$ and $w_j$ are keywords extracted from articles $A_1$ and $A_2$, respectively, $W_{ij}$ is the longest matching part character string in these keywords, $|w_i|$, $|w_j|$ and $|w_{ij}|$ are the respective length of the two keywords and the longest matching part character string, respectively, and $n(A_1)$ and $n(A_2)$ are the numbers of keywords extracted from the two articles.

Figure 14:
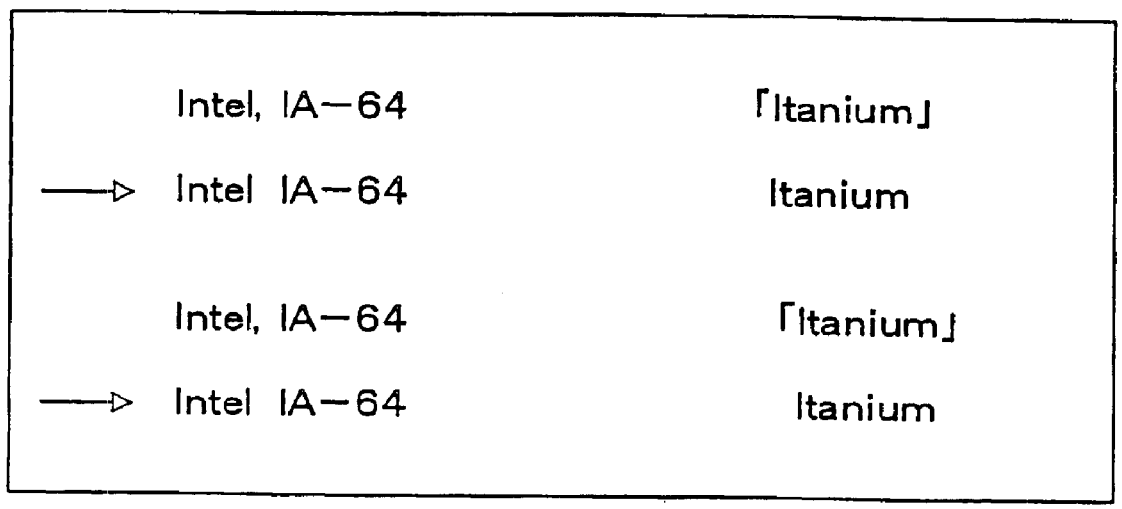
FIG. 14 shows the keyword extraction for the calculation of similarity degree.

The calculation of similarity degree is further described with reference to FIGS. 14 and 15. FIG. 14 shows how to extract keywords from two articles. In this example, it is assumed that one keyword is extracted from each of two article titles. Characters that do not directly indicate the content of an article, such as hiragana, parentheses/brackets, punctuation marks, etc., are regarded as boundaries between keywords and are separated from the titles of articles, and the separated results are made keywords. In the case of an English article, for example, nouns and verbs are extracted as keywords.

Six and five keywords are extracted from the upper and lower titles, respectively, of articles. Therefore, the number $n(A_1)$ of keywords for the upper article $A_1$ and the number $n(A_2)$ of keywords for the lower article $A_2$ are 6 and 5, respectively.

Figure 15:
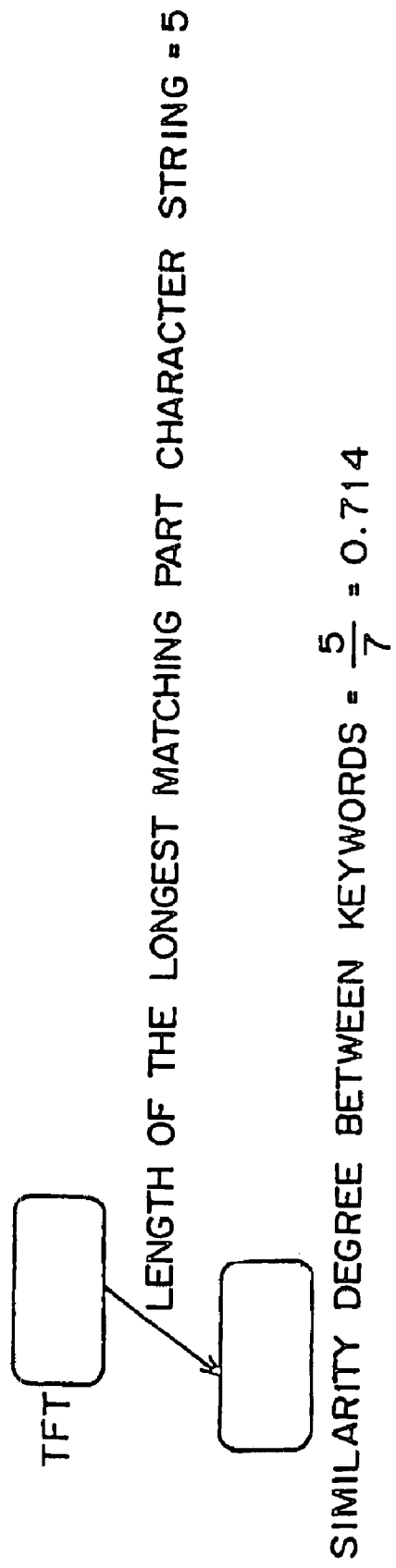
FIG. 15 shows the similarity degree between two keywords.

FIG. 15 shows how to calculate $S_{ij}$ according to equation (2) using the longest matching part character string between two keywords. If in FIG. 15 it is assumed that the upper "TFT z,1" and the lower "z,2" are $w_i$ and $w_j$, respectively, "z,1" is the longest matching part character string, the length is 5. However, $w_j$ is shorter than $w_i$ and the length is 7. Therefore, the value of the similarity degree $S_{ij}$ between the two keyword is 5/7, that is, 0.714.

The similarity degree S for FIG. 14 is obtained by calculating the value Sij between the upper and lower keywords in the same way, and dividing the total by the number $n(A_2)$ (=5) of keywords for the lower article title.

Returning to FIG. 13, if in step S17, the similarity degree between arbitrary two articles is calculated for all the articles read in step S17, in step S18, article groups with high similarity degree are formed into a related article group based on the calculation result, and the process is terminated. In this generation process of a related article group, a threshold value is provided to similarity degree and two articles with similarity degree equal to or more than the threshold value are grouped. This threshold value is relative and a pre-process, such as a process where data are prepared in advance and an appropriate value can be easily found, becomes necessary.

FIG. 16 is a flowchart showing the process of the topicality degree calculation unit 26 shown in FIG. 3. If in FIG. 16 the process is started, first, in step S20, for each related article group, information about articles belonging to the group are read, in step S21 both the total number of articles and the number of information sources are calculated for each related article group, in step S22 the topicality degree of each related article group is calculated based on these calculation results and the process is terminated.

Topicality degree T is calculated according to the following equation.

$$T = mn^2 \times \sqrt[n]{\prod_{i=1}^{n} \frac{m_i}{m}} \qquad (3)$$

In the above equation, m is the total number of articles belonging to a group, n is the number of information sources distributing the articles belonging to the group and $m_i$ (i=1, 2, . . . m) is the number of articles for each information source.

Generally, one group is considered to be an aggregate of articles on one topic. Therefore, it is considered that the greater the total number m of articles belonging to a group, the higher the topicality degree. It can be considered that the greater is the number of information sources distributing these articles, for example, the more newspapers report on the topic and the higher is the topicality degree accordingly. In equation (3), special weight is put on the number of information sources, and $mn^2$ is multiplied to a root sign.

If articles are equally distributed from each information source even when both the total number of articles and the number of information sources are the same, it is considered that there is higher topicality than the case where the number of articles varies depending on an information source. For example, if the total number of articles m=6 and the number of information sources n=3, and if two articles each are distributed from three information sources ($m_1=m_2=m_3=2$), the solution of equation (3) is 18. However, for example, if two, three and one articles are distributed from the first, second and third information sources, respectively, ($m_1=2$, $m_2=3$ and $m_3=1$), the solution is $9x^3\sqrt{6}$. Therefore, topicality degree in the case where articles are equally distributed is higher than that in the case where articles are not equally distributed.

FIG. 17 is a flowchart showing the process of the typical article selection unit 27 shown in FIG. 3. If in FIG. 17 the process is started, first, in step S24, out of related article groups, one with the highest topicality is selected as a key related article group. In this selection, for example, the threshold value of topicality degree is predetermined, and if a related article group with topicality degree exceeding the threshold value is selected as a key related article group. This threshold value is also relative. Alternatively, related article groups can be arranged in descending order of topicality degree, and a specific number of higher-order related article groups can be selected as key related article groups.

Then, in step S25, a typical article is selected for each selected key related article group and the process is terminated. Out of the article group belonging to the key related article group, a typical article is selected, for example, based on user's requirements. For example, if a user mainly requests the latest information, an article with the latest distribution date is selected as a typical article. If a user requests progress information about how the situation of a specific topic has been going on, an article with a fairly old distribution date, such as an article one week before, is selected as a typical article. If a user requests detailed information about a specific topic, an article on the specific topic with the longest article text is selected as a typical article. If a user requests brief information about a specific topic, an article on the specific topic with the shortest text is selected as a typical article. The number of typical articles for each key related article group is not limited to one, and a plurality of articles can be selected as typical articles.

Figure 18:
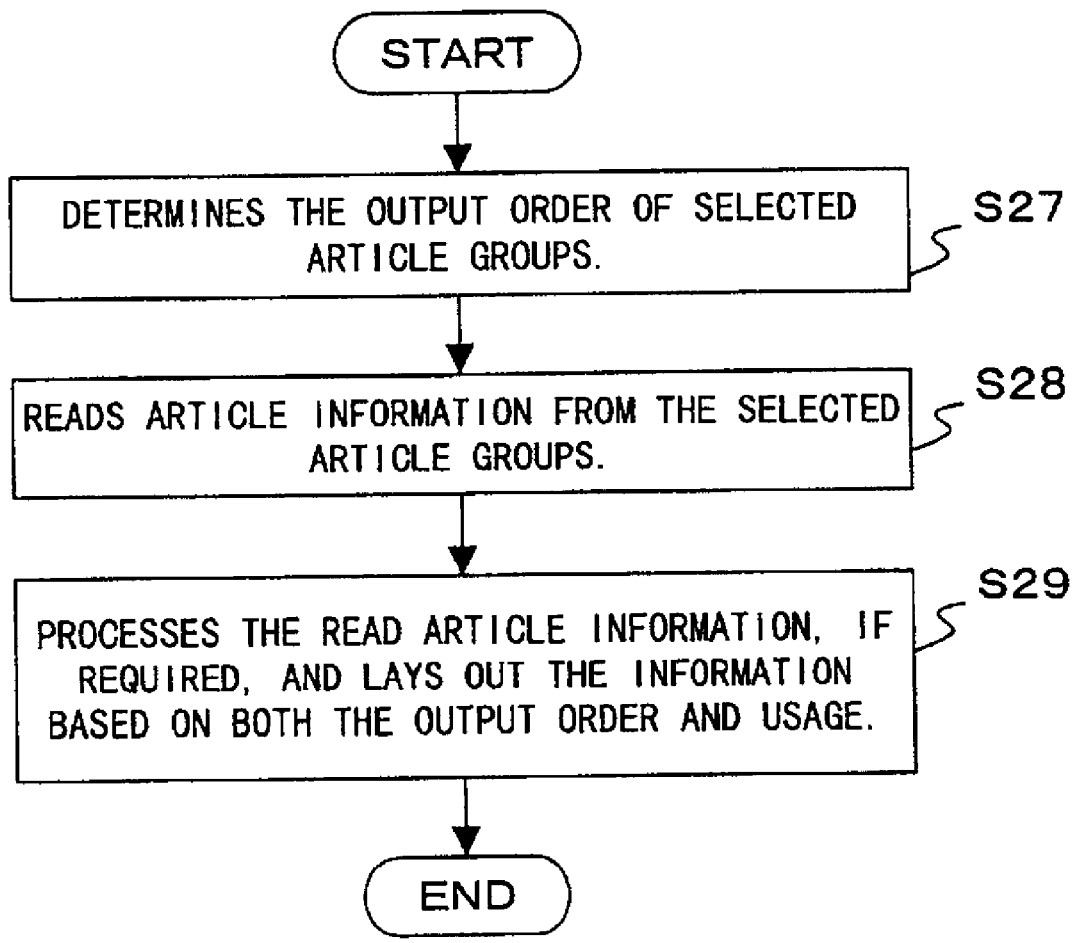
FIG. 18 is a flowchart showing the entire process of an article re-editing unit.

FIG. 18 is a flowchart showing the entire process of the article re-editing unit 16 shown in FIG. 3. If in FIG. 18, the process is started, first, in step S27, the output order of the article groups selected by the typical article selection unit 27 of the article selection unit 15 is determined. For example, these typical articles can be arranged in descending order of the topicality degree for each key related article group or in descending order of the distribution date.

Then, in step S28, the article information of the selected article group is read from the article information storage unit 22, in step S29, the read article information is processed, if required, for example, based on user's requirements, the results are arranged according to both the output order and layout suited for a user's usage and are outputted to the presenting unit 17. Then, the process is terminated.

Figure 19:
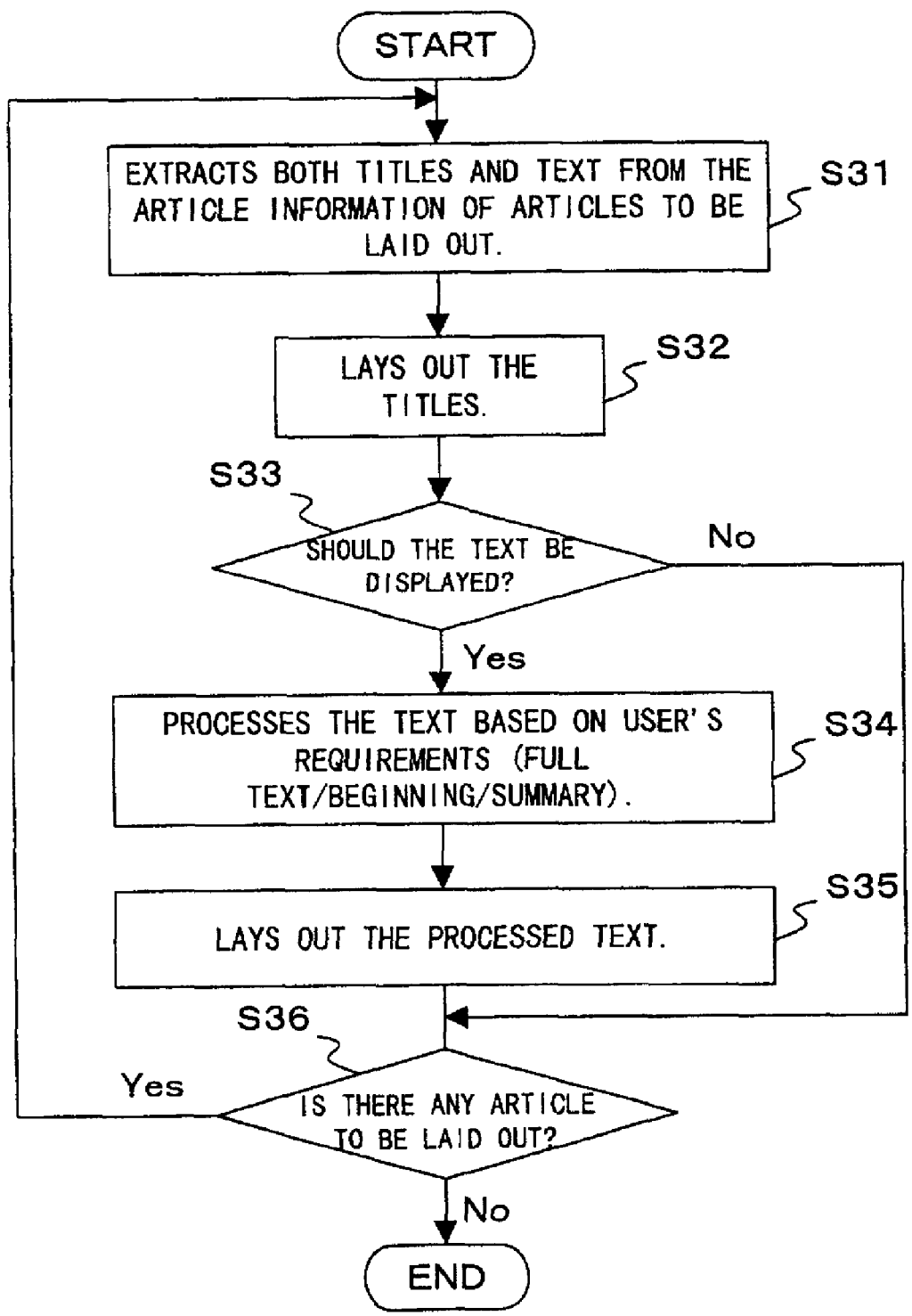
FIG. 19 is a flowchart showing the detailed article allocation by the article re-editing unit.

FIG. 19 is a flowchart showing the detailed article information locating process in step S29 shown in FIG. 18. If in FIG. 19 the process is started, first, in step S31 titles and a plurality of pieces of text to be arranged are extracted from the article information read in step S28, in step S32 the titles are located, and in step S33 it is judged whether the plurality of pieces of text should be displayed. If it is judged that the plurality of pieces of text are not displayed, in step S36 it is judged whether there is another article to be located. If it is judged that there is another article to be displayed, processes in steps S31 and after are repeated. If it is judged that there is no other article, the process is terminated without any process.

If in step S33 it is judged that the plurality of pieces of text are also displayed, in step S34 the plurality of pieces of text are processed based on user's requirements, in step S35 the processed plurality of pieces of text are located and the processes in steps 36 and after are executed. Necessary respective processes are executed for the plurality of pieces of text depending on the user's requirements, that is, whether full text, a part in the beginning or a summary should be displayed.

FIG. 20 shows an example of requirement input screen for inputting user's requirements on news information presenting. Although in FIG. 2 it is assumed that user's requirements are provided to the article selection unit 15, in FIG. 3 these requirements can be provided to the related article group generation unit 25 in such a way to input a target time period in step S11 shown in FIG. 12 or can also be directly provided to the article re-editing unit 16 without passing via the article selection unit 15.

In the example shown in FIG. 20, it is requested that the target time period is October 1 to October 31, that the number of topics to be displayed, that is, the number of related article groups is three, that two articles should be selected in descending order of distribution date for each topic as typical articles and that articles should be displayed in a form of summarized article text.

FIGS. 21 through 24 show examples of re-edited articles. In the first example shown in FIG. 21, only one typical article is selected from each key related article group, and the title and text of the article are listed. The information sources and distribution dates of the articles are also outputted.

In the second example shown in FIG. 22, a plurality of typical articles are selected from one key related article group. For example, an optimal article meeting user's requirements is outputted as a typical article, and other typical articles are outputted as related articles. If a typical article includes a drawing, chart, etc., which is not shown in FIG. 22, the graphic data can also be read from the article information storage unit 22 and can also be outputted together with article text.

If the content of an article is outputted, the full text of the article can be outputted. If a user wants to output in a brief form or information amount to be outputted on a display screen is restricted, only a part of the text can be also outputted. In this case, for example, only a predetermined amount of information in the beginning of the text of an article can be outputted or the summary of the article can be generated and outputted using both the title and text of the article. For the generation of such a summary, see the following reference.

Japanese Patent Laid-open No. 10-207891, Yoshio Nakao, "Document Summarizing Device and Its Method"

In the third example shown in FIG. 23, only a part of the text of an article is extracted or a summary is generated and outputted. In this case, as underlined and shown in FIG. 23, the full text of an original article can be accessed by setting a hyperlink to each title of articles. This can be implemented by a publicly known technology, such as an HTML (Hypertext Markup Language), etc.

In the fourth example shown in FIG. 24, one typical article and the titles of related articles as other typical articles are displayed on the left and right sides for each key related article group, only a part of article text is also outputted and further hyperlinks are set to the titles of articles.

In this way, a method for outputting related article information, a method for outputting only a part of article text, a method for outputting graphics and a method for setting a hyperlink can also be arbitrarily combined.

Furthermore, news information can also be re-edited in a form suited for loud reading as one process of the article re-editing unit 16. FIG. 25 shows an example of the result of re-editing an article in a form suited for such loud reading. In the case of loud reading, it is preferable for a content to be outputted to be as simple as possible. Therefore, in this case, as shown in FIG. 25, for example, only the titles of articles are laid out.

Lastly, the presenting unit 17 shown in FIG. 3 actually presents news information re-edited by the article re-editing unit 16 to a user. In this case, the re-edited news information can be displayed on the screen, the information can be printed using a printer or further the audio output of output text for loud reading can be used together with the display on the screen by a speech synthesis technology.

Figure 26:
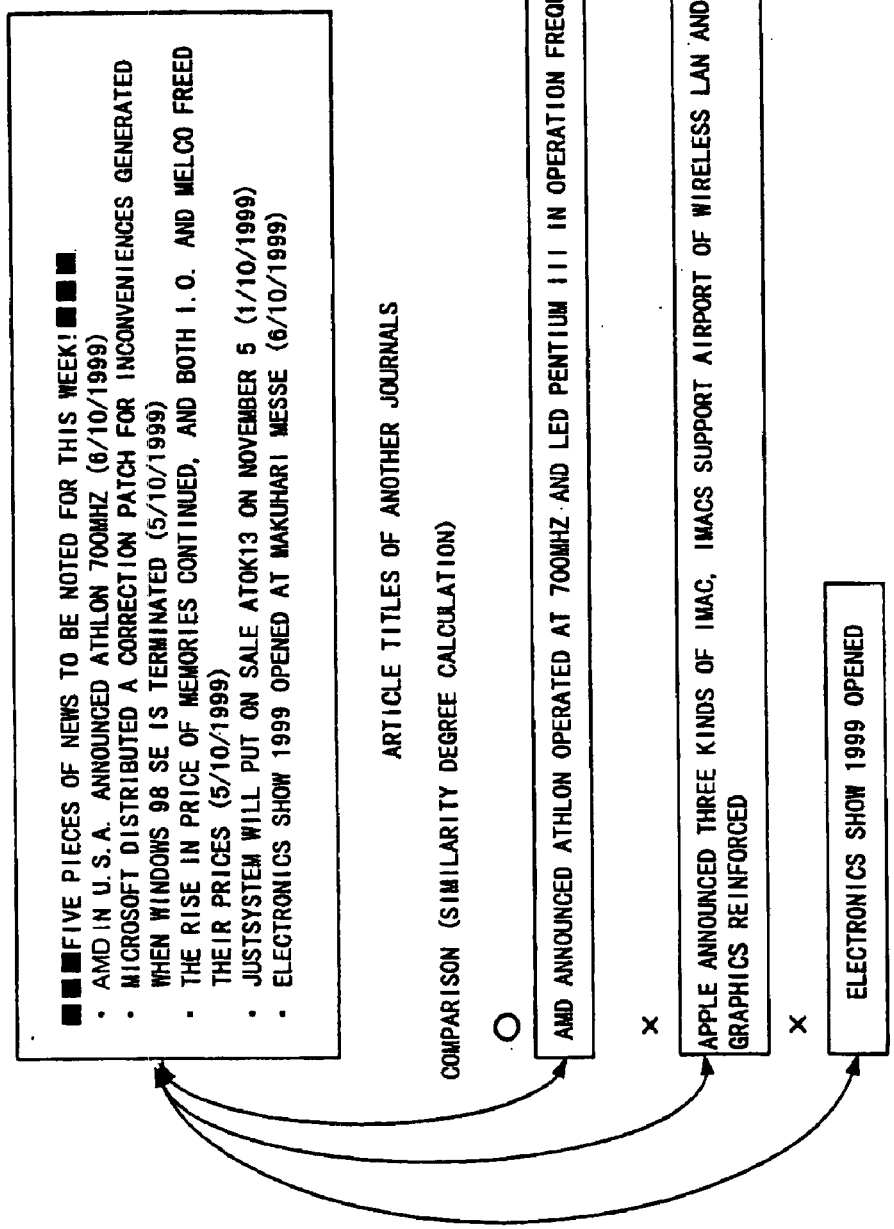
FIG. 26 shows a preferred embodiment in which key related article groups are designated using other information sources.

FIG. 26 shows a different preferred embodiment. In this different preferred embodiment, if a key related article group is selected from article groups generated by the related article group generation unit 25 shown in FIG. 3, the key related article group is determined by another information source without calculating topicality degree. For example, the respective similarity degrees between each of the titles of the typical articles selected in advance from each related article group based on user's requirements and the title of an article in another journal is calculated, the similarity degrees are compared and a related article group belonging to a typical article with high similarity degree is designated as a key related article group.

In this example, not only the comparison between the title of each typical article and the first title out of the article titles of another journal is made, but the comparison between the title of each typical article and the last title of another journal can also be made. In this way, a related article group to which a typical article at the bottom, "Electronics Show 1999 opened" belongs is also designated as a key related article group.

As the last preferred embodiment, the loading of a program used in the present invention into a computer is described. For example, although the news information presenting device shown in FIG. 3 is generally implemented, for example, by a personal computer installed near a user, it can also be implemented by a computer installed on the side of a news information presenting service operator. For example, news information can be presented by enabling a computer to execute the program specified in claim 16 of the present invention, programs described in flowcharts shown in FIGS. 4, 5, 12, 13 and 16 through 19, etc.

Figure 27:
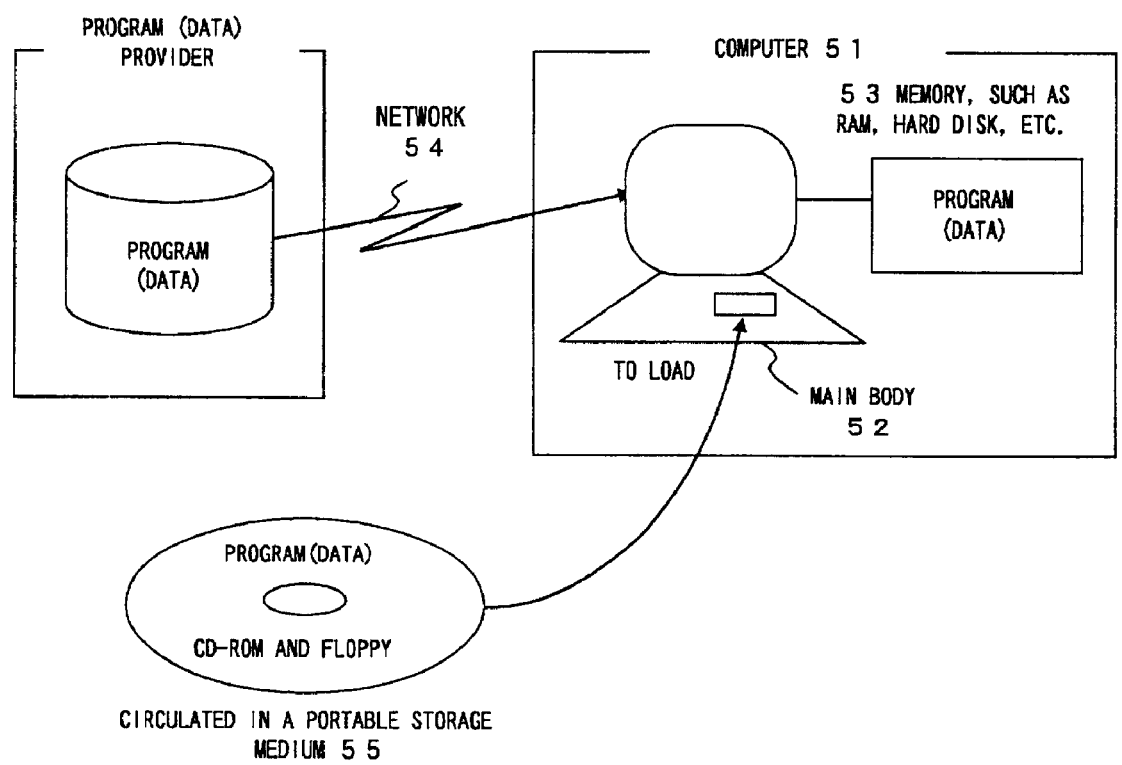
FIG. 27 shows how to load the program of the present invention into a computer.

FIG. 27 shows how to load such a program into a computer. The computer 51 for implementing the news information presenting device shown in FIG. 3 comprises a main body 52 and a memory 53. For the memory 53, a random-access memory (RAM), a hard disk, a magnetic disk, etc., can be used. A program is stored in such a memory, and news information can be presented to a user by the main body 52 executing the program.

The news information presenting of the present invention can also be conducted by loading such a program into the computer 51 from a program provider via a network 54. In this case, transmission signals obtained by modulating a carrier wave with data signals representing the program is transmitted from the program provider to the computer 51 via the network 54, which is a transmission medium, and on receipt of the transmission signals, the computer 51 demodulates and reproduces the program. In this way, the program can be executed.

Furthermore, such a program can also be stored in a portable storage medium on the market, and the news information presenting of the present invention can also be conducted by loading the portable storage medium 55 into the main body 52. The portable storage medium 55 can be sold and bought on the market. For example, for the memory, a variety of storage media, such as a floppy disk, a CD-ROM, an optical disk, a magneto-optical disk, etc., can be used.

As described in detail above, according to the present invention, distributed news information is broken down into individual articles, articles with related contents are grouped as a related article group, and the news information is re-edited and presented. Therefore, a user can efficiently obtain useful information. Topicality degree is calculated for article groups with related contents, and only article groups with high topicality degree can be presented to a user. Therefore, if a user has no clear intention to search or if a user wants to know generally topical information regardless of a field, useful information can be obtained. This greatly contributes to the improvement of the utility of news information presenting devices.

What is claimed is:

1. A computing device comprising a processor and memory for extracting useful information from news information and presenting the information to a user, comprising:
   a news information division unit breaking down the news information in units of articles;
   a useful article selection unit selecting useful articles from the broken-down articles; and
   a news information re-editing unit collecting the selected articles, re-editing the articles in a form of news information suited to be presented to a user and outputting the re-edited articles, wherein the useful article selection unit includes:

an article grouping unit classifying the broken-down articles into a plurality of groups based on similarity degree among the broken-down articles;

an article group selection unit selecting one or more groups from the plurality of the groups based on topicality degree for indicating degree of topicality of each of the groups; and a typical article selection unit selecting one or more articles from articles belonging to each of the selected groups and designating the articles as typical articles of the group, wherein the similarity degree among all combinations of two articles are calculated using keywords extracted from the two articles for all articles within a target time period designated by the user, and articles with high similarity degree are formed into one related article group, wherein the topicality degree of each related article group is calculated based on a total number of articles and a number of information sources are calculated for each related article group, wherein the related article group with the topicality degree exceeding a predetermined threshold value is selected as a key related article group, and wherein the typical article is selected for each selected key related article group belonging to the key related article group based on a requirement set by the user.

2. The device according to claim 1, wherein said news information division unit detects article portions included in the news information by analyzing a document format of the news information and breaks down the article portions in units of articles.

3. The device according to claim 1, wherein said article group selection unit calculates the topicality degree based on both total number of articles belonging to the group and total number of information sources of articles belonging to the group.

4. The device according to claim 1, further comprising a user instruction input unit inputting the user's instructions on news information presenting, wherein said typical article selection unit selects one or more articles from articles belonging to each of the groups selected by the article group selection unit according to the instructions inputted to the user instruction input unit.

5. The device according to claim 1, wherein said news information re-editing unit outputs typical articles selected from the groups in an order corresponding to topicality degree of a group selected by the said article group selection unit.

6. The device according to claim 1, wherein said news information re-editing unit outputs the typical articles in an order corresponding to distribution date of news information including articles that are selected from groups selected by said article group selection unit.

7. The device according to claim 1, wherein said news information re-editing unit outputs simplified typical articles obtained by omitting a part of contents of typical articles that are selected from the groups selected by said article group selection unit and sets up hyperlinks for indicating the location of the typical articles in the simplified typical articles.

8. The device according to claim 1, wherein said news information re-editing unit outputs typical articles that are selected from the groups selected by said article group selection unit and also outputs graphics included in the typical articles.

9. The device according to claim 1, wherein said news information re-editing unit converts contents of typical articles that are selected from the groups selected by said article group selection unit into a form suited for loud reading and outputs the converted contents.

10. The device according to claim 4, wherein said typical article selection unit selects one or more articles from articles belonging to each of the groups selected by the article group selection unit according to the instruction on distribution date of news information including the articles.

11. The device according to claim 5, wherein said news information re-editing unit outputs typical articles selected from groups selected by said article group selection unit and also outputs other typical articles selected from the groups as related articles.

12. The device according to claim 6, wherein said news information re-editing unit outputs typical articles that are selected from groups selected by said article group selection unit and also outputs other typical articles selected from the groups as related articles.

13. The device according to claim 9, wherein said news information re-editing unit outputs only titles of typical articles that are selected from the groups selected by said article group selection unit.

14. A computing device comprising a processor and memory for extracting useful information from news information and presenting the information to a user, comprising:

information division means for breaking down the news information in units of articles;

useful article selection means for selecting useful articles from the broken-down articles; and news information re-editing means for collecting the selected articles, and re-editing the articles in a form of news information suited to be presented to a user and outputting the re-edited articles, wherein the useful article selection means includes:

article grouping means for classifying the broken-down articles into a plurality of groups based on similarity degree among the broken-down articles;

article group selection means for selecting one or more groups from the plurality of the groups based on topicality degree for indicating degree of topicality of each of the groups; and typical article selection means for selecting one or more articles from articles belonging to each of the selected groups and designating the articles as typical articles of the group, wherein the similarity degree among all combinations of two articles are calculated using keywords extracted from the two articles for all articles within a target time period designated by the user, and articles with high similarity degree are formed into one related article group, wherein the topicality degree of each related article group is calculated based on a total number of articles and a number of information sources are calculated for each related article group, wherein the related article group with the topicality degree exceeding a predetermined threshold value is selected as a key related article group, and wherein the typical article is selected for each selected key related article group belonging to the key related article group based on a requirement set by the user.

15. A method for electrically extracting useful information from news information and presenting the information to a user, comprising:

breaking down the news information in units of articles;

selecting useful articles from the broken-down articles; and collecting the selected articles, and re-editing the articles in a form of news information suited to be presented to a user and outputting the reedited articles, wherein the selecting includes:

classifying the broken-down articles into a plurality of groups based on similarity degree among the broken-down articles;

selecting one or more groups from the plurality of the groups based on topicality degree for indicating degree of topicality of each of the groups; and selecting one or more articles from articles belonging to each of the selected groups and designating the articles as typical articles of the group, wherein the similarity degree among all combinations of two articles are calculated using keywords extracted from the two articles for all articles within a target time period designated by the user, and articles with high similarity degree are formed into one related article group, wherein the topicality degree of each related article group is calculated based on a total number of articles and a number of information sources are calculated for each related article group, wherein the related article group with the topicality degree exceeding a predetermined threshold value is selected as a key related article group, and wherein the typical article is selected for each selected key related article group belonging to the key related article group based on a requirement set by the user.

16. A computer-readable storage medium on which is recorded a program to direct a computer to extract useful information from news information and to present the extracted information to a user, said program directing the computer to execute:

breaking down the news information in units of articles;

selecting useful articles from the broken-down articles; and collecting the selected articles, re-editing the articles in a form of news information suited to be presented to a user and outputting the re-edited articles, wherein the selecting includes:

classifying the broken-down articles into a plurality of groups based on similarity degree among the broken-down articles;

selecting one or more groups from the plurality of the groups based on topicality degree for indicating degree of topicality of each of the groups; and selecting one or more articles from articles belonging to each of the selected groups and designating the articles as typical articles of the group, wherein the similarity degree among all combinations of two articles are calculated using keywords extracted from the two articles for all articles within a target time period designated by the user, and articles with high similarity degree are formed into one related article group, wherein the topicality degree of each related article group is calculated based on a total number of articles and a number of information sources are calculated for each related article group, wherein the related article group with the topicality degree exceeding a predetermined threshold value is selected as a key related article group, and wherein the typical article is selected for each selected key related article group belonging to the key related article group based on a requirement set by the user.

17. A computing device comprising a processor and memory for extracting useful information from news information and presenting the information to a user, comprising:

a news information division unit breaking down the news information in units of articles;

a useful article selection unit selecting useful articles from the broken-down articles; and a news information re-editing unit collecting the selected articles, re-editing the articles in a form of news information suited to be presented to a user and outputting the re-edited articles, wherein the useful article selection unit includes:

an article grouping unit classifying the broken-down articles into a plurality of groups based on a similarity degree S among the broken-down articles;

an article group selection unit selecting one or more groups from the plurality of the groups based on a degree of topicality T of each of the groups; and a typical article selection unit selecting one or more articles from articles belonging to each of the selected groups and designating the articles as typical articles of the group, wherein the similarity degree S between two articles $A_1$ and $A_2$ is calculated according to:

$$S = \frac{\sum_{i,j} S_{ij}}{\min\{n(A_1), n(A_2)\}}, \text{ wherein } S_{ij} = \frac{|W_{ij}|}{\min(|W_i|, |W_j|)},$$

wherein $W_i$ and $W_j$ are keywords extracted from the articles $A_1$ and $A_2$, respectively, wherein $W_{ij}$ is a longest matching part character string in the extracted keywords $W_i$ and $W_j$, wherein $|W_i|$, $|W_j|$ and $|W_{ij}|$ are lengths of the keywords $W_i$ and $W_j$ and the longest matching part character string $W_{ij}$, respectively, and wherein $n(A_1)$ and $n(A_2)$ are the numbers of keywords extracted from the articles $A_1$ and $A_2$, respectively.

18. The device according to claim 17, wherein the degree of topicality T is calculated according to:

$$T = mn^2 \times \sqrt[n]{\prod_{i=1}^{n} \frac{m_i}{m}},$$

wherein m is a total number of articles belonging to a group, n is a number of information sources distributing the articles belonging to the group and $m_i$ (i=1, 2, ... m) is a number of articles for each information source.

* * * * *

UNITED STATES PATENT AND TRADEMARK OFFICE
CERTIFICATE OF CORRECTION

| | |
|---|---|
| PATENT NO. | : 7,137,067 B2 |
| APPLICATION NO. | : 09/748373 |
| DATED | : November 14, 2006 |
| INVENTOR(S) | : Takashi Yanase |

Page 1 of 1

It is certified that error appears in the above-identified patent and that said Letters Patent is hereby corrected as shown below:

Column 15, Line 4, change "electrically" to --electronically--.

Column 15, Line 12, change "reedited" to --re-edited--.

Signed and Sealed this

Thirteenth Day of March, 2007

JON W. DUDAS
*Director of the United States Patent and Trademark Office*